US 11,185,913 B2

(12) United States Patent
Ikuta et al.

(10) Patent No.: US 11,185,913 B2
(45) Date of Patent: Nov. 30, 2021

(54) FASTENING TOOL

(71) Applicant: MAKITA CORPORATION, Anjo (JP)

(72) Inventors: Hiroki Ikuta, Anjo (JP); Toshihito Yabunaka, Anjo (JP); Takao Kuroyanagi, Anjo (JP)

(73) Assignee: MAKITA CORPORATION, Anjo (JP)

(*) Notice: Subject to any disclaimer, the term of this patent is extended or adjusted under 35 U.S.C. 154(b) by 252 days.

(21) Appl. No.: 16/465,135

(22) PCT Filed: Nov. 24, 2017

(86) PCT No.: PCT/JP2017/042305
§ 371 (c)(1),
(2) Date: May 29, 2019

(87) PCT Pub. No.: WO2018/101180
PCT Pub. Date: Jun. 7, 2018

(65) Prior Publication Data
US 2019/0283112 A1    Sep. 19, 2019

(30) Foreign Application Priority Data

Nov. 30, 2016 (JP) .............................. JP2016-233638

(51) Int. Cl.
*B21J 15/26* (2006.01)
*F16C 19/30* (2006.01)

(52) U.S. Cl.
CPC .............. *B21J 15/26* (2013.01); *F16C 19/30* (2013.01)

(58) Field of Classification Search
CPC ........ B21J 15/26; B21J 15/105; B21J 15/022; F16C 19/30
See application file for complete search history.

(56) References Cited

U.S. PATENT DOCUMENTS 4,914,933 A * 4/1990 Schepergerdes ...... B25B 27/143
72/114
5,473,805 A * 12/1995 Wille ....................... B21J 15/26
29/243.526

(Continued)

FOREIGN PATENT DOCUMENTS

CN        101360920 A    2/2009
EP        0 953 390 A2   11/1999

(Continued)

OTHER PUBLICATIONS

Nov. 3, 2020 Office Action issued in Chinese Patent Application No. 201780072683.3.

(Continued)

*Primary Examiner* — Lee A Holly
(74) *Attorney, Agent, or Firm* — Oliff PLC

(57) ABSTRACT

A fastening tool includes a bolt-gripping part, an anvil, a bolt-gripping-part driving mechanism, a motor, a housing, and thrust rolling bearings. The bolt-gripping-part driving mechanism includes a first mechanism part supported by the housing and a second mechanism part connected to the bolt-gripping part. The second mechanism part is configured to be driven in a longitudinal-axis direction by the first mechanism part being rotationally driven, so that the bolt-gripping part is moved in the longitudinal-axis direction relative to the anvil. The thrust rolling bearings are disposed on a first direction side and a second direction side of the first mechanism part, respectively.

7 Claims, 10 Drawing Sheets

(56) References Cited

U.S. PATENT DOCUMENTS

| | | | |
|---|---|---|---|
| 6,237,390 B1 | 5/2001 | Honsel et al. | |
| 2015/0023622 A1* | 1/2015 | Yoshizaki | F16C 33/6633 384/462 |
| 2015/0074964 A1 | 3/2015 | Masugata | |
| 2016/0356275 A1* | 12/2016 | Delgado Marquez | F04D 13/10 |
| 2017/0361370 A1* | 12/2017 | Godfrey | B21J 15/105 |

FOREIGN PATENT DOCUMENTS

| | | |
|---|---|---|
| EP | 2 716 383 A2 | 4/2014 |
| JP | H11-320016 A | 11/1999 |
| JP | 2003-311363 A | 11/2003 |
| JP | 2010-509547 A | 3/2010 |
| JP | 2013-248643 A | 12/2013 |
| WO | 02/23056 A1 | 3/2002 |
| WO | 2008/054397 A1 | 5/2008 |

OTHER PUBLICATIONS

May 12, 2020 Office Action issued in Japanese Patent Application No. 2016-233638.
Jun. 19, 2020 Extended Search Report issued in European Patent Application No. 17875121.0.
Jun. 4, 2019 International Preliminary Report on Patentability issued in International Patent Application No. PCT/JP2017/042305.
Sep. 8, 2020 Office Action issued in Japanese Patent Application No. 2016-233638.
Feb. 27, 2018 International Search Report issued in International Patent Application No. PCT/JP2017/042305.
Mar. 20, 2020 Office Action issued in Chinese Patent Application No. 201780072683.3.
Apr. 1, 2021 Office Action issued in Chinese Patent Application No. 201780072683.3.

* cited by examiner

FASTENING TOOL

TECHNICAL FIELD

The present invention relates to a fastening tool which uses a fastener including a bolt and a cylindrical hollow collar that is engageable with the bolt, the bolt having a head part integrally formed with a shaft part having a groove, to fasten a workpiece between the head part and the collar.

BACKGROUND ART

As for a fastening operation of a workpiece using the fastener configured as described above, two types are known. Firstly, swaging operation may be completed while an end region of the shaft part of the bolt remains integrated with the shaft part. Secondly, swaging operation may be completed while the end region of the shaft part is broken and removed from the shaft part. The former type (first type) may be advantageous in that an additional process of reapplying a coating agent to a broken part can be omitted since the fastening operation is performed without breaking the shaft part. The latter type (second type) may be advantageous in that the fastener is reduced in height when the swaging operation is completed since the end region of the shaft part is broken and removed.

As an example of a fastening tool using a fastener of the above-described first type, WO 2002/023056 discloses a fastening tool, including a bolt-gripping part configured to grip an end region of a shaft part, and an anvil configured to be engaged with a collar. The bolt-gripping part is moved relative to the anvil by utilizing fluid pressure generated by a piston-cylinder, so that the anvil presses the collar and the workpiece is clamped between the collar and the head part.

In the fastening tool for fastening a workpiece using a fastener of the above-described first type, close output management is required in swaging operation in order to perform the swaging operation without breaking the end region of the shaft part. Further, since the fastener having fastened a workpiece is firmly stuck to the fastening tool, the fastening tool needs to be devised to reliably release the fastener from the fastening tool after completion of swaging. In the fastening tool disclosed in the above-described publication, output is controlled utilizing fluid pressure, so that output management required for swaging is facilitated and the fastener having fastened the workpiece can be reliably released from the fastening tool via a large output. However, it is difficult to realize a compact device structure in such a fastening tool of fluid pressure type.

Further, apart from the above-described fasteners of the first and second types, a compact electric fastening tool using a so-called blind rivet is also known as disclosed, for example, in Japanese Unexamined Patent Application Publication No. 2013-248643. In this case, the fastening operation using the blind rivet is completed with the shaft part broken, so that, unlike in the case of swaging the fastener of the above-described first type, there is little need for such a fastening tool to perform close output management and to be devised to reliably release the fastener firmly stuck to the fastening tool from the fastening tool after completion of swaging.

SUMMARY OF THE INVENTION

Problem to be Solved by the Invention

Accordingly, it is an object of the present invention to rationalize the structure of a fastening tool using a fastener of the above-described first type, which is configured such that a swaging operation is completed while an end region of a shaft part of a bolt remains integrated with the shaft part.

Embodiment to Solve the Problem

A fastening tool according to the present invention is provided in order to solve the above-described problem. The fastening tool uses a fastener including a bolt and a cylindrical hollow collar that is engageable with the bolt, the bolt having a head part integrally formed with a shaft part having a groove, to fasten a workpiece between the head part and the collar.

The fastening tool according to the present invention includes a bolt-gripping part that is configured to grip an end region of the shaft part, an anvil that is configured to be engaged with the collar, a bolt-gripping-part driving mechanism that is configured to drive the bolt-gripping part to move in a specified longitudinal-axis direction relative to the anvil, a motor that is configured to drive the bolt-gripping-part driving mechanism, and a housing that at least partially or wholly houses the bolt-gripping-part driving mechanism.

The manner in which "the housing at least partially or wholly houses the bolt-gripping-part driving mechanism" includes a manner in which the housing houses only a portion of the bolt-gripping-part driving mechanism, a manner in which the housing houses the whole of the bolt-gripping-part driving mechanism, a manner in which the housing houses a portion of the bolt-gripping-part driving mechanism and a component other than the bolt-gripping-part driving mechanism, and a manner in which the housing houses the whole of the bolt-gripping-part driving mechanism and a component other than the bolt-gripping-part driving mechanism.

Further, the "housing" only needs to be configured to house at least a portion or the whole of the bolt-gripping-part driving mechanism, regardless of its external form, presence or absence of an exposed portion or the degree of exposure thereof.

Further, when the bolt-gripping part grips the end region of the shaft part and moves relative to the anvil in a specified first direction of the longitudinal-axis direction, the anvil presses the collar fitted onto the shaft part in a second direction opposite to the first direction of the longitudinal-axis direction and inward in a radial direction of the collar, so that a hollow part of the collar is crimped to the groove while the workpiece is clamped between the collar and the head part, whereby swaging of the fastener is completed while the end region remains integrated with the shaft part. Typically, the "first direction" and the "second direction" here may refer to a direction toward a rear side of the fastening tool and a direction toward a front side of the fastening tool, respectively.

Further, when the bolt-gripping part grips the end region of the shaft part and moves relative to the anvil in the second direction via the bolt-gripping-part driving mechanism, the collar swaged to the bolt is released from the anvil and the end region of the shaft part is allowed to be released from the bolt-gripping part.

Further, the bolt-gripping-part driving mechanism includes a first mechanism part that is supported by the housing in a state in which a movement of the first mechanism part in the longitudinal-axis direction relative to the housing is restricted and that is configured to be rotationally driven by the motor, and a second mechanism part that is connected to the bolt-gripping part in a state in which a movement of the second mechanism part in the longitudinal-axis direction is allowed and a rotation of the second mechanism part around the longitudinal-axis direction is restricted. The second mechanism part is configured to be driven in the longitudinal-axis direction by the first mechanism part being rotationally driven, so that the bolt-gripping part is moved in the longitudinal-axis direction relative to the anvil.

As the bolt-gripping-part driving mechanism, for example, a ball-screw mechanism may be suitably employed in which the first mechanism comprises a ball nut and the second mechanism comprises a ball-screw shaft. In a case where the ball-screw mechanism is employed in the present invention, the structure of the bolt-gripping-part driving mechanism can be made compact by coaxially arranging the ball nut and the ball-screw shaft, and load can be distributed to a plurality of balls provided as a power transmission medium. Further, the reduction gear ratio between the ball nut and the ball-screw shaft can be set relatively large, so that the need for a number of rotation speed reducing mechanisms on a path for transmitting output of the motor to the bolt-gripping-part driving mechanism can be avoided or reduced, which may contribute to simplification of the device structure of the fastening tool.

As the bolt-gripping-part driving mechanism, apart from the ball-screw mechanism, for example, a rack-and-pinion mechanism in which the first mechanism part comprises a pinion gear and the second mechanism part comprises a rack part, or a rotation-linear motion converting mechanism such as a cam mechanism may be employed.

When fastening a workpiece, using the fastener of the above-described first type which is configured such that a swaging operation is completed while the end region of the shaft part of the bolt remains integrated with the shaft part, while applying a strong force accompanied by deformation of the fastener, very strong load (axial force) is required to move the bolt-gripping part relative to the anvil. Further, when releasing the collar swaged to the bolt from the anvil after completion of the swaging operation, strong load (axial force) is also required since the collar is firmly stuck to the anvil. Both of the loads are required to move the bolt-gripping part relative to the anvil, and the bolt-gripping-part driving mechanism for driving the bolt-gripping part is also subjected to these loads. Specifically, in the present invention, with the structure in which the second mechanism part is driven in the longitudinal-axis direction by the first mechanism part being rotationally driven so that the bolt-gripping part is moved in the longitudinal-axis direction relative to the anvil, such load is applied as an axial force in the longitudinal-axis direction to the first mechanism part via the second mechanism part from the bolt-gripping part. When a strong axial force in the longitudinal-axis direction is applied to the first mechanism part as described above, the axial force may impede smooth rotation of the first mechanism part.

In the present invention, the structure of the first mechanism part is devised to prevent the axial force from impeding rotation of the first mechanism part during the swaging operation and when the collar is released from the anvil after completion of the swaging operation. Specifically, thrust rolling bearings are disposed on the first direction side and on the second direction side of the first mechanism part, respectively, and each of the thrust bearings is configured to receive an axial force in the longitudinal-axis direction which is transmitted from the bolt-gripping part to the first mechanism part via the second mechanism part while allowing the first mechanism part to rotate.

During the swaging operation and when the collar is released from the anvil, the thrust rolling bearing receives the axial force applied to the first mechanism part in the longitudinal-axis direction, while rolling around the longitudinal-axis direction. The thrust rolling bearing typically includes a track part, rolling elements and a rolling-element holding part. As the thrust rolling bearing, for example, any one of a thrust ball bearing, a thrust angular ball bearing, a thrust cylindrical roller bearing, a thrust needle roller bearing (needle bearing), a thrust conical roller bearing, and a thrust automatic aligning roller bearing may be suitably employed.

In the present invention, the thrust rolling bearing provided on the second direction side of the first mechanism part is configured to reliably receive a force which is generated by the movement of the bolt-gripping part relative to the anvil during the swaging operation, that is, an axial force which is transmitted from the bolt-gripping part to the first mechanism part via the second mechanism part when swaging the fastener by moving the bolt-gripping part relative to the anvil in the first direction, thereby preventing occurrence of a trouble in rotation of the first mechanism part.

The thrust rolling bearing provided on the first direction side of the first mechanism part is configured to reliably receive a force which is generated when releasing the collar swaged to the bolt from the anvil after completion of the swaging operation, that is, an axial force which is required to release the collar from the anvil by moving the bolt-gripping part relative to the anvil in the second direction, thereby preventing occurrence of a trouble in rotation of the first mechanism part.

The thrust rolling bearing on the first direction side of the first mechanism part (a first thrust rolling bearing) and the thrust rolling bearing on the second direction side of the first mechanism part (a second thrust rolling bearing) only need to be configured to reliably receive the axial force in the longitudinal-axis direction while allowing smooth rotation of the first mechanism part relative to the housing. Both or one of the thrust rolling bearings may be directly connected in abutment with the first mechanism part, or may be indirectly connected to the first mechanism part via an intervening member such as a thrust washer. Further, the first and second thrust rolling bearings may be disposed between the first mechanism part and a component of the fastening tool other than the housing, in place of being disposed between the first mechanism part and the housing.

In addition to the thrust rolling bearings that are respectively disposed on the first and second direction sides of the first mechanism part, a radial bearing may be provided to support the first mechanism part. This provision can further secure smooth rotation of the first mechanism part around the longitudinal-axis direction. Further, the radial bearing may be provided not only on the first and second direction sides of the first mechanism part but also in an outer peripheral region of the first mechanism part.

As the "motor" in the present invention, a compact brushless motor having high output may be suitably employed, but it is not limited to this. Further, a direct current (DC) battery which can be mounted to the fastening tool may be suitable as a means for supplying driving current to the motor, but, for example, an alternate current (AC) power source may also be employed.

The "workpiece" in the present invention may typically consist of a plurality of members to be fastened each having a through hole, and the members to be fastened may be suitably formed of metal material requiring fastening strength. In this case, it may be preferable that the members to be fastened each having a through hole are superimposed such that the through holes are aligned with each other, or the members to be fastened are superimposed and then the through holes are formed therethrough. In this state, it may be preferable that the shaft part of the bolt of the fastener is inserted through the through holes, and the fastener is set such that the head part of the bolt is arranged on one end side of the aligned through holes and the collar is arranged on the other end side.

The "fastening tool" according to the present invention may be suitably used in cases where a workpiece needs to be fastened with especially high strength, such as in manufacturing transport equipment such as aircrafts and automobiles and in fastening an installation base for a solar panel or a plant.

The "bolt-gripping part" in the present invention may comprise a plurality of claws (also referred to as jaws) which can be engaged with the end region of the shaft part. In this case, the claws may be configured to be movable in the radial direction of the shaft part so as to be switched between an engagement position in which the claws grip the end region and a release position in which the claws release the end region. The manner of switching the position of the claws between the engagement position and the release position may include a manner in which the switching operation is automatically performed following the shape of the anvil while the bolt-gripping part moves relative to the anvil, and a manner in which the switching operation is manually performed by user.

The "bolt" in the present invention may also be defined as a pin. In the present invention, the "groove" to which the hollow part of the collar is crimped (swaged) may be formed at least in a crimping position of the shaft part, but grooves may be formed elsewhere in the shaft part or over the whole length of the shaft part. The groove(s) formed in a position other than the crimping position may be used, for example, to position or temporarily fix the collar. The "anvil" in the present invention may preferably be a metal anvil configured to deform the collar by a swaging force and may preferably have a bore (open hollow part) for receiving the outer periphery of the collar.

A first example of the "anvil" may preferably be configured such that the bore has a tapered part and has a diameter smaller than the outer diameter of a swaging region of the collar. With this structure, when the bolt-gripping part moves in a fastening direction relative to the anvil, the tapered part of the anvil presses the collar in the longitudinal-axis direction in abutment with the collar, and along with further relative movement of the bolt-gripping part, the collar proceeds into the bore of the anvil while being pressed inward in the radial direction. As a result, the collar clamps the workpiece in cooperation with the head part, and is pressed inward in the radial direction by the bore of the anvil and deformed to be reduced in diameter, so that the hollow part of the collar is crimped (swaged) into the groove of the shaft part. Thus, the collar is swaged onto the bolt and the workpiece is fastened by the fastener.

Further, a second example of the "anvil" may also be employed which is configured such that: when the collar has an uneven outer diameter, having a large diameter part and a small diameter part, during a fastening operation, an end portion of the collar which has a smaller diameter than a bore diameter of the anvil is inserted into the bore without deforming, and a specified part of the collar which has a larger diameter than the bore diameter of the anvil is pressed in the radial direction by the bore of the anvil while being pressed in the longitudinal-axis direction by the anvil, along with a relative movement of the bolt-gripping part, thereby being deformed to be reduced in diameter and swaged. Further, a third example, which is a combination of the above-described first and second examples, may also be employed.

In a preferred aspect of the invention, the thrust rolling bearing on the first direction side may preferably be formed by a needle bearing. As described above, the thrust rolling bearing on the first direction side may receive a force which is generated when releasing the collar swaged to the bolt from the anvil after completion of the swaging operation, that is, an axial force which is required to release the collar from the anvil by moving the bolt-gripping part relative to the anvil in the second direction. This axial force may be a strong load, but relatively smaller than the axial force which is applied to the thrust rolling bearing on the second direction side during the swaging operation of the fastener. Therefore, considering that the load applied to the thrust rolling bearing on the first direction side is smaller than the load applied to the thrust rolling bearing on the second direction side, it may be preferable that the needle bearing, which is advantageous for realizing a compact and simple structure, is employed as the thrust rolling bearing on the first direction side.

In a further preferred aspect of the invention, the first thrust rolling bearing may preferably be configured to abut on a rear end portion of the first mechanism part. Such a structure can avoid increase of the axial dimension and contribute to size reduction of the device. Further, the manner of "abutting on the rear end portion" here does not exclude that an auxiliary member such as a thrust washer and an O-ring is disposed between the first thrust rolling bearing and the first mechanism part. It is noted that the rear end portion may be typically formed by a rear end surface crossing the longitudinal-axis direction.

In a further preferred aspect of the invention, the bolt-gripping-part driving mechanism may preferably comprise a ball-screw mechanism including a ball nut serving as the first mechanism part and a ball-screw shaft serving as the second mechanism part. In this case, the first and second mechanism parts may be engaged with each other via balls disposed therebetween, as the ball-screw mechanism. Further, a gear may preferably be provided on the ball nut and may be configured to rotationally drive the ball nut via the motor. Further, an outer periphery of the gear of the ball nut may preferably be configured to lie within an outer shell of the housing in an upper portion of the housing. The manner in which the outer periphery of the gear lies within the outer shell of the housing in the upper portion of the housing may mean that the gear of the first mechanism part fits within the housing in an up-down direction of the housing, which may contribute to reduction of a center height of the fastening tool.

In a further preferred aspect of the present invention, a planetary-gear mechanism for speed reduction may preferably be disposed on a power transmission path from the motor to the first mechanism part. The planetary-gear mechanism has a characteristic of being able to secure a relatively large speed reduction ratio at the time of power transmission, for the occupied volume, so that the need for a number of speed reducing mechanisms on the power transmission path can be avoided or reduced, which may contribute to simplification of the device structure of the fastening tool. Particularly, a ball-screw nut mechanism capable of securing a large speed reduction ratio may be advantageously employed as the bolt-gripping-part driving mechanism, which may contribute to further simplification and size reduction of the device structure.

In a further preferred aspect of the invention, at least one of the thrust rolling bearings on the first and second direction sides may preferably be configured to have a larger diameter than an outer diameter of the first mechanism part. According to this aspect, load per unit area of the axial force applied to the thrust rolling bearing in the longitudinal-axis direction can be reduced.

In a further preferred aspect of the invention, thrust washers may preferably be disposed between the housing and the thrust rolling bearing on the first direction side, and between the housing and the thrust bearing on the second direction side, respectively. According to this aspect, provision of the thrust washers can improve ease of assembly and performance characteristics of the members.

In a further preferred aspect of the present invention, a restricting member that is configured to restrict the rotation of the second mechanism part around the longitudinal axis may be further provided. The restricting member may preferably also serve to guide the movement of the second mechanism part in the longitudinal-axis direction. According to this aspect, the member configuration relating to operation of the second mechanism part can be simplified and rationalized.

In a further preferred aspect of the invention, the restricting member may preferably include a guide member which is connected to the housing and extends in the longitudinal-axis direction and a guided member which is connected to the second mechanism part and configured to be guided in the longitudinal-axis direction in abutment with the guide member. According to this aspect, the functions of restricting the rotation and guiding the movement can be reliably performed by abutment between the members.

In a preferred aspect of the present invention, the guide member may preferably comprise an elongate hole extending in the longitudinal-axis direction and the guided member may preferably comprise a roller which is fitted in the elongate hole in abutment with the elongate hole. According to this aspect, the functions of restricting the rotation and guiding the movement of the second mechanism part can be performed by a simple structure comprising the elongate hole and the roller.

Effect of the Invention

The present invention provides a technique which may contribute to further rationalization of the structure of a fastening tool using a fastener of the above-described first type, which is configured such that a swaging operation is completed while an end region of a shaft part of a bolt remains integrated with the shaft part.

DESCRIPTION OF EMBODIMENT

A fastening tool 100 that is configured to fasten a workpiece via a fastener is now explained as an embodiment of the present invention with reference to the drawings.

Figure 1:
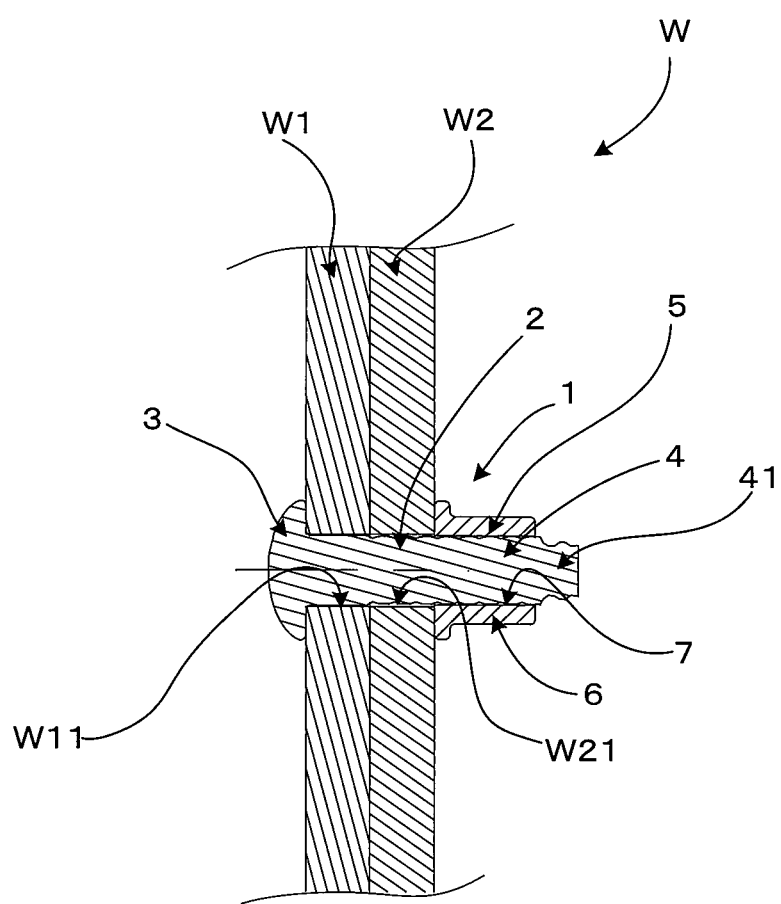
FIG. 1 is a sectional front view showing a workpiece and a fastener according to an embodiment of the invention.

FIG. 1 shows a workpiece W and a fastener 1 according to an embodiment of the present invention. In the present embodiment, as an example, the workpiece W consists of plate-like metal members W1, W2 to be fastened, and the members W1, W2 to be fastened are superimposed such that through holes W11, W21 respectively formed in advance in the members W1, W2 to be fastened are aligned with each other.

The fastener 1 mainly includes a bolt 2 and a collar 6. The bolt 2 has a head 3 and a bolt shaft 4 integrally formed with the head 3 and having grooves 5 formed in its outer periphery. The head 3 is an example that corresponds to the "head part" according to the present invention. The grooves 5 are formed over substantially the whole length in the axial direction of the bolt shaft 4. The collar 6 has a cylindrical shape having a hollow collar part 7 and may be engaged with the bolt 2 such that the bolt shaft 4 is inserted through the hollow collar part 7. An inner wall of the hollow collar part 7 has a smooth surface and, although not particularly shown, has an engagement part for temporarily fixing the collar 6 fitted onto the bolt shaft 4. In FIG. 1, the fastener 1 is shown with the collar 6 temporarily fixed in engagement with the grooves 5 of the bolt shaft 4.

Figure 2:
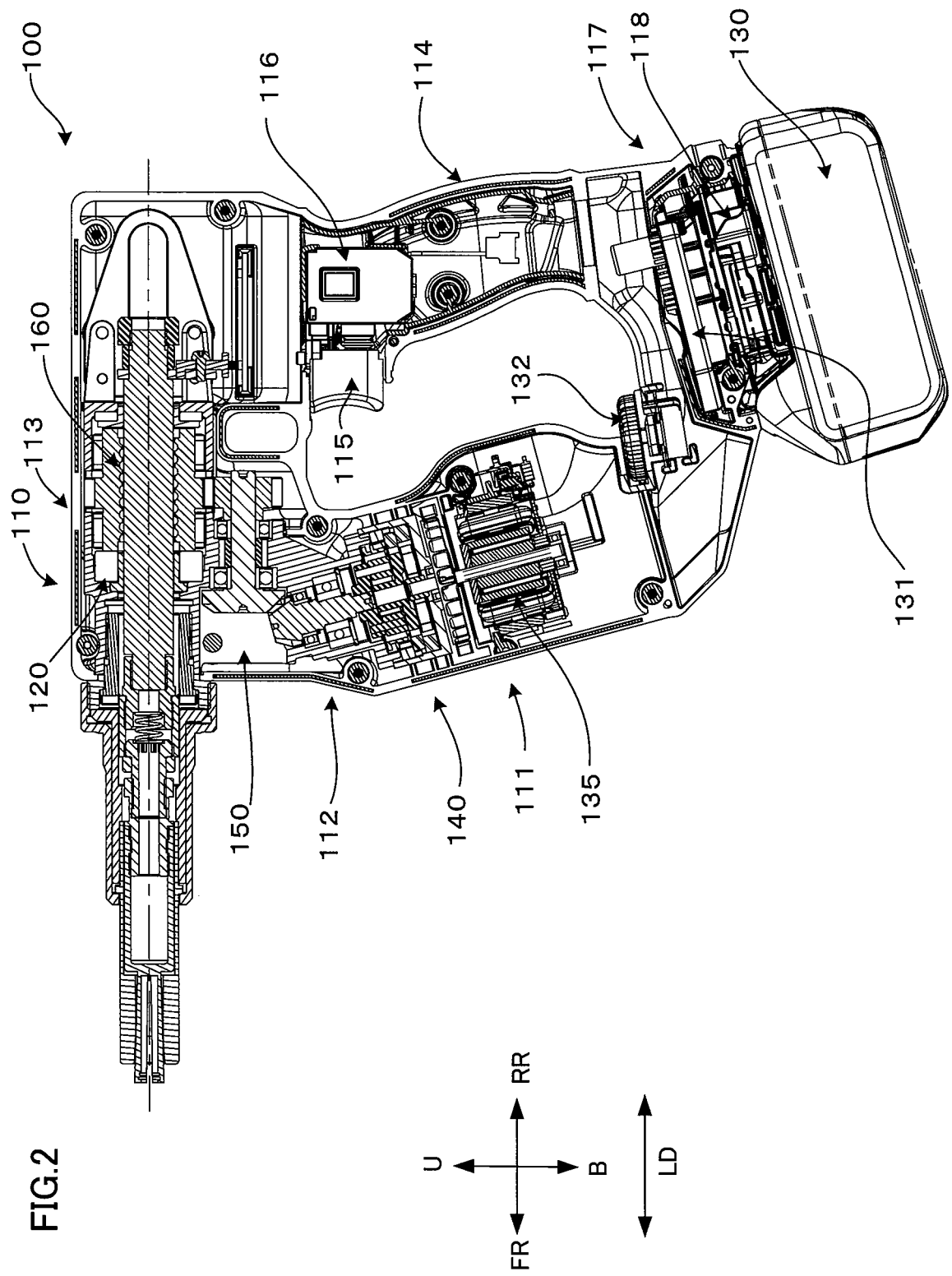
FIG. 2 is a sectional front view showing the whole structure of a fastening tool according to the embodiment of the invention.

FIG. 2 shows the whole structure of the fastening tool 100 according to the embodiment of the present invention. The fastening tool 100 may also be referred to as a riveter or lock bolt tool.

In the following description, the symbol "FR" is defined as a front side direction (left side direction on the paper face of FIG. 2) of the fastening tool 100, the symbol "RR" a rear side direction (right side direction on the paper face of FIG. 2), the symbol "U" an upper side direction (upper side direction on the paper face of FIG. 2), the symbol "B" an lower side direction (lower side direction on the paper face of FIG. 2), the symbol "L" a left side direction (lower side direction on the paper face of FIG. 5), the symbol "R" a right side direction (upper side direction on the paper face of FIG. 5), and the symbol "LD" an extending direction of a longitudinal axis of the fastening tool, that is, a longitudinal-axis direction (left-right direction on the paper face of FIG. 2). These symbols are appropriately shown in the drawings.

The rear side direction RR, the front side direction FR and the longitudinal-axis direction LD in the present embodiment are examples that correspond to the "first direction", the "second direction" and the "longitudinal-axis direction", respectively, according to the present invention.

As shown in FIG. 2, an outer shell of the fastening tool 100 mainly includes an outer housing 110 and a grip part 114 connected to the outer housing 110.

The outer housing 110 mainly includes a motor housing region 111 for housing a motor 135, an inner-housing housing region 113 for housing an inner housing 120, and a controller housing region 117 for housing a controller 131. The inner housing 120 is a housing member for a planetary-gear speed-reducing mechanism 140, a bevel-gear speed-reducing mechanism 150 and a ball-screw mechanism 160, which will be described in detail later. A battery mounting part 118 is provided on a lower end portion of the controller housing region 117 and configured such that a battery 130, which serves as a driving power source for the motor 135, can be removably connected to the fastening tool 100.

In FIG. 2, a region adjacent to the motor housing region 111 in the inner-housing housing region 113 is shown as a speed-reducing-gear housing region 112 for housing the planetary-gear speed-reducing mechanism 140 and the bevel-gear speed-reducing mechanism 150.

Further, an operation dial 132 for setting a threshold relating to a driving current value of the motor 135 is provided in a connecting region between the motor housing region 111 and the controller housing region 117. An indication of thresholds (in a stepless level in the present embodiment) is printed on a display part of an upper surface of the operation dial 132, so that a user can set the threshold to any value by manually operating the operation dial 132. Details about the threshold will be described later.

A trigger 115 which is configured to be manually operated by a user and an electric switch assembly 116 which is configured to be turned on and off in response to the manual operation of the trigger 115 are arranged in the grip part 114.

The controller housing region 117, the motor housing region 111, the inner-housing housing region 113 (including the speed-reducing-gear housing region 112) and the grip part 114 are contiguously arranged to form a closed loop.

Figure 3:
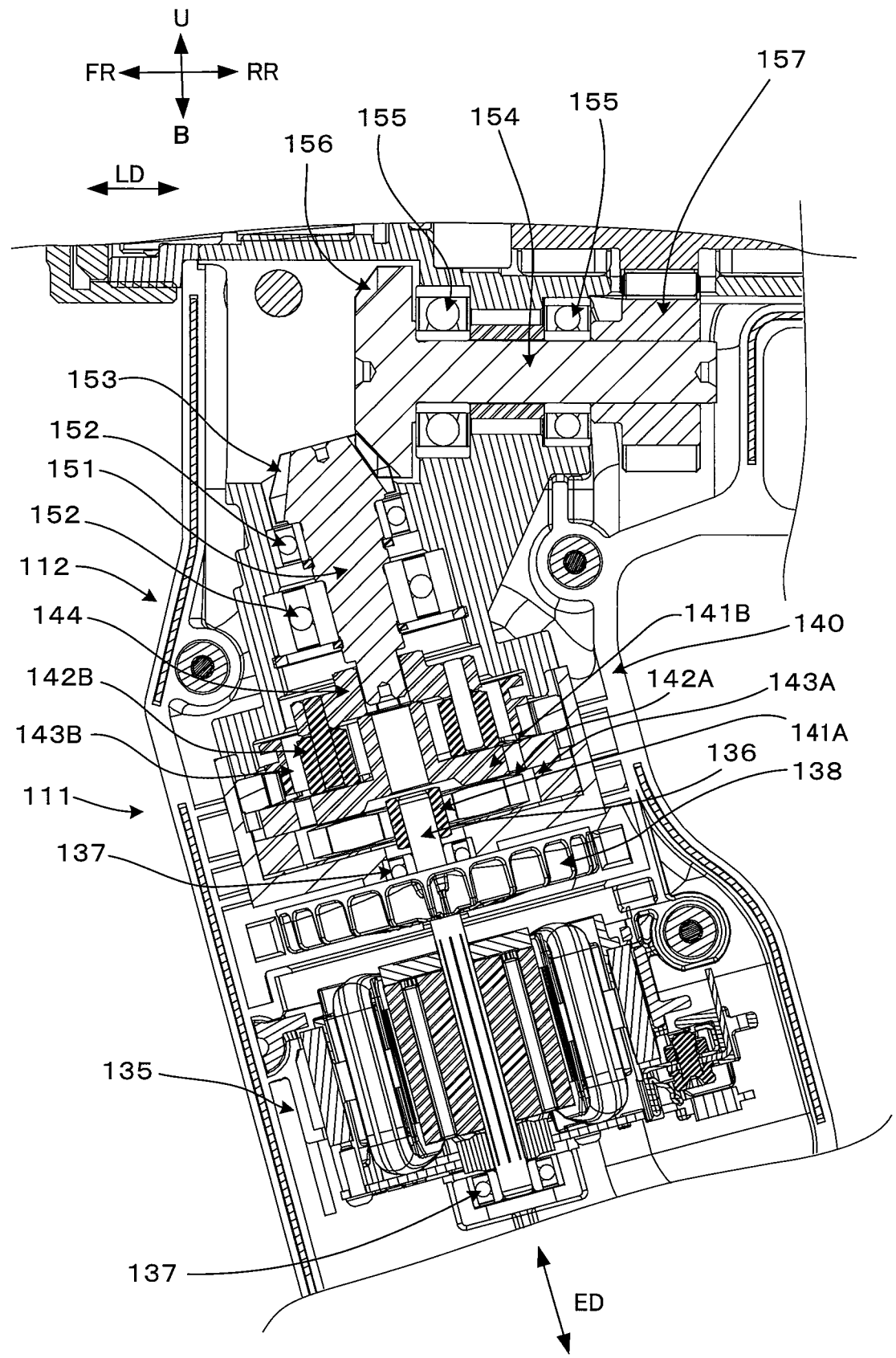
FIG. 3 is a partial sectional view showing the structure of part of an outer housing of the fastening tool.

FIG. 3 shows the structures of the motor housing region 111 and the speed-reducing-gear housing region 112 in detail.

A DC brushless motor is employed as the motor 135, which is housed in the motor housing region 111. A motor output shaft 136, to which a cooling fan 138 is mounted, is rotatably supported by bearings 137 at both end regions. One end of the motor output shaft 136 is connected to a first sun gear 141A of the planetary-gear speed-reducing mechanism 140 so that the motor output shaft 136 and the first sun gear 141A integrally rotate.

The planetary-gear speed-reducing mechanism 140, which is housed in the speed-reducing-gear housing region 112, is of a two-stage speed reduction type. The first speed reduction stage mainly includes the first sun gear 141A, a plurality of first planetary gears 142A meshed with the first sun gear 141A, and a first internal gear 143A meshed with the first planetary gears 142A. The second speed reduction stage mainly includes a second sun gear 141B which also serves as a carrier of the first planetary gears 142A, a plurality of second planetary gears 142B meshed with the second sun gear 141B, a second internal gear 143B meshed with the second planetary gears 142B, and a carrier 144 which is configured to rotate along with a revolving movement of the second planetary gears 142B.

The carrier 144 is connected to a drive-side intermediate shaft 151 of the bevel-gear speed-reducing mechanism 150, which is housed adjacent to the planetary-gear speed-reducing mechanism 140 within the speed-reducing-gear housing region 112, so that the carrier 144 and the drive-side intermediate shaft 151 integrally rotate.

The bevel-gear speed-reducing mechanism 150 mainly includes the drive-side intermediate shaft 151 supported at both ends by bearings 152, a drive-side bevel gear 153 provided on the drive-side intermediate shaft 151, a driven-side intermediate shaft 154 supported at both ends by bearings 155, a driven-side bevel gear 156 provided on the driven-side intermediate shaft 154, and a ball-nut drive gear 157. The "intermediate shaft" here refers to an intermediate shaft provided on a path for transmitting rotation output of the motor 135 from the motor output shaft 136 to a ball-screw mechanism 160, which will be described later (see FIG. 4). An extending direction ED of the motor output shaft 136 and the drive-side intermediate shaft 151 obliquely crosses an extending direction of the driven-side intermediate shaft 154, which is the longitudinal-axis direction LD.

Figure 4:
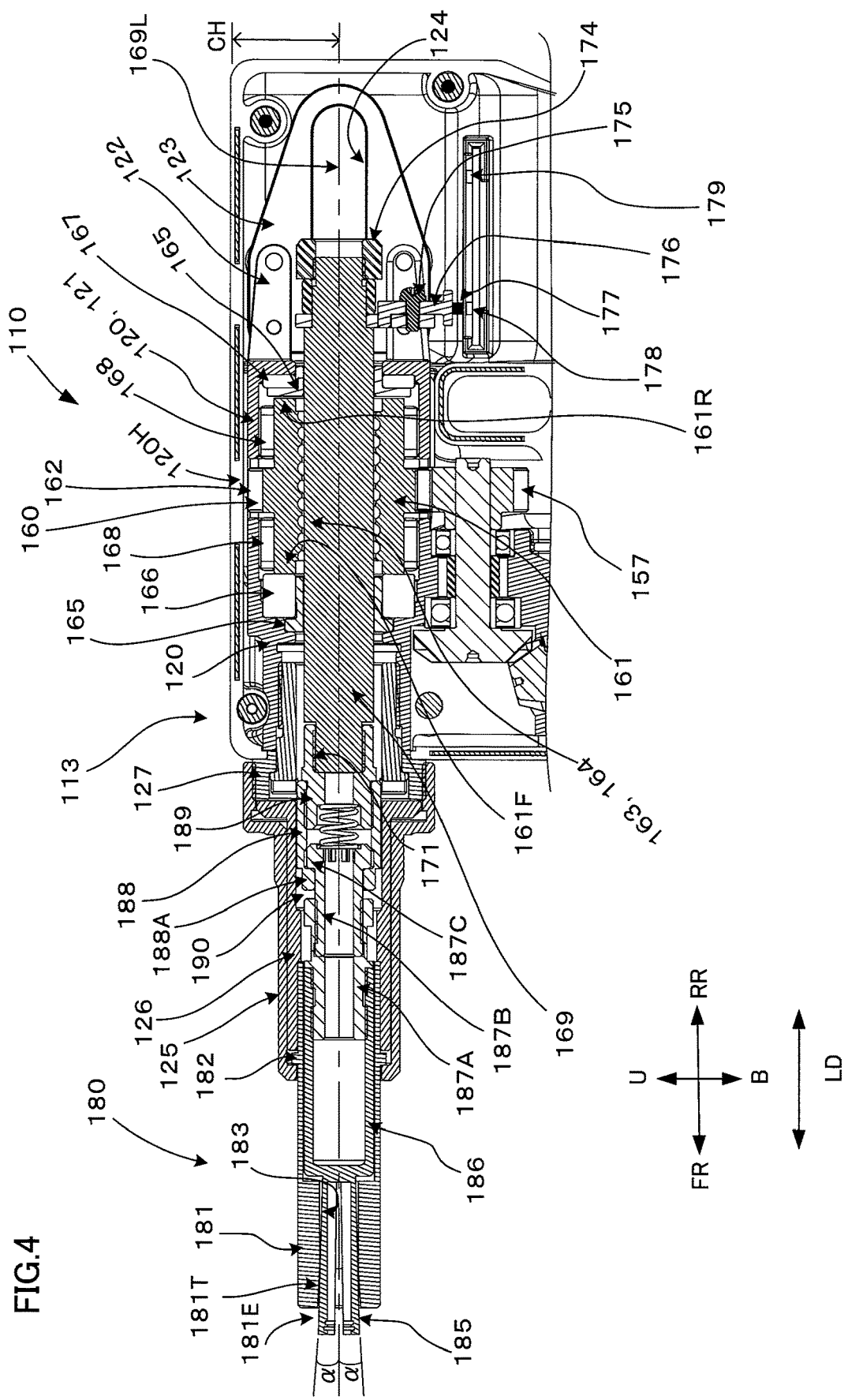
FIG. 4 is a partial sectional view showing the detailed structure of an inner housing of the fastening tool.
Figure 5:
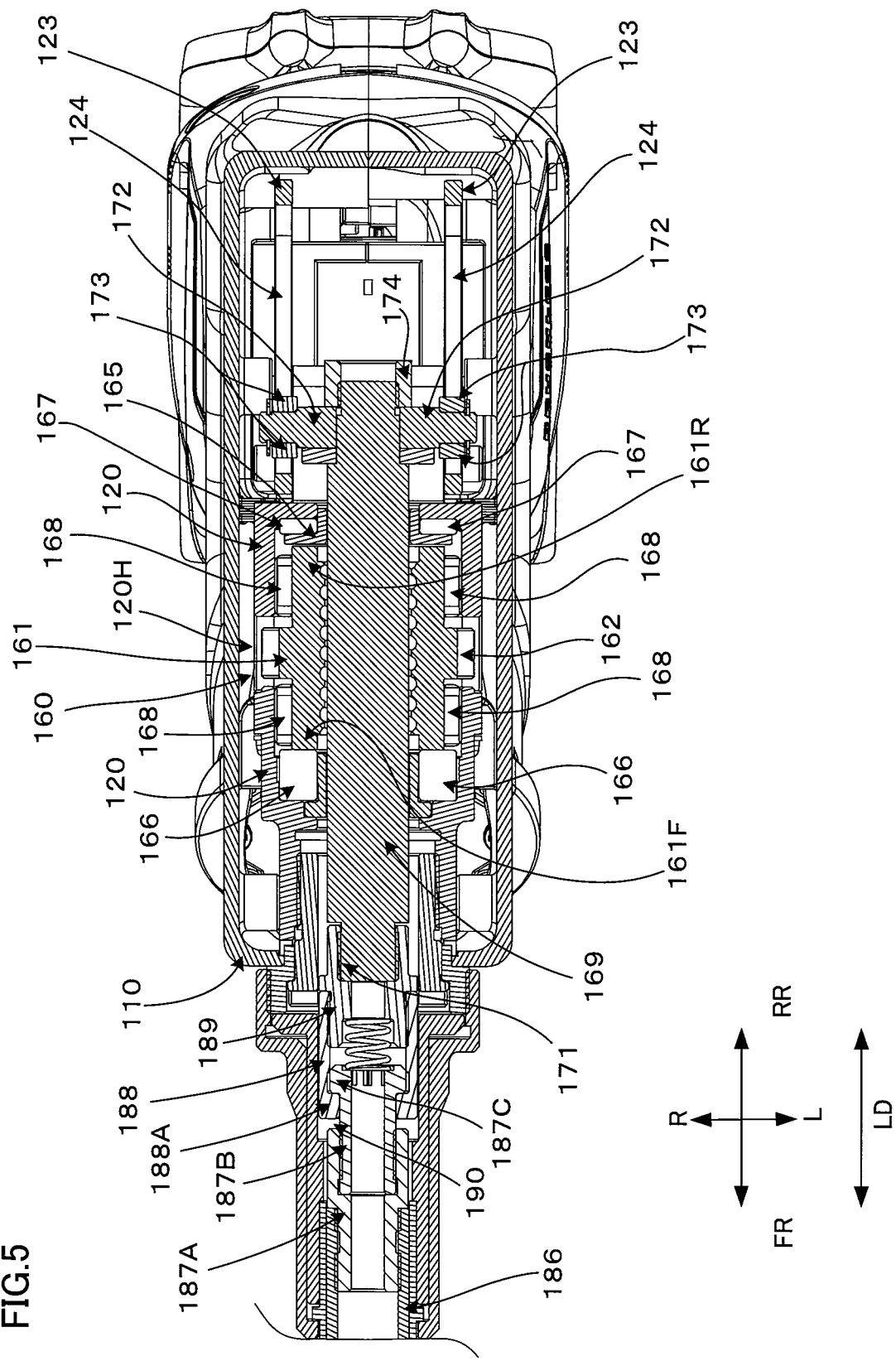
FIG. 5 is a sectional plan view corresponding to the partial sectional view of FIG. 4.

FIGS. 4 and 5 show the structure of the inner-housing housing region 113 in detail. As described above, the inner housing 120, which is housed in the inner-housing housing region 113, is a housing member for the planetary-gear speed-reducing mechanism 140, the bevel-gear speed-reducing mechanism 150 and the ball-screw mechanism 160. In the present embodiment, although not shown for convenience sake, a region of the inner housing 120 for housing the planetary-gear speed-reducing mechanism 140 is formed of resin, while a region for housing the bevel-gear speed-reducing mechanism 150 and the ball-screw mechanism 160 is formed of metal, and the both regions are integrally connected to each other with screws.

As shown in FIG. 4, guide flanges 123 are connected to an end of the inner housing 120 in the rear side direction RR via guide-flange mounting arms 122. The guide flanges 123 each have an elongate guide hole 124 extending in the longitudinal-axis direction LD. The inner housing 120 in the present embodiment is an example that corresponds to the "housing" according to the present invention.

Further, a sleeve 125 for locking an anvil 181 is connected to the other end of the inner housing 120 in the front side direction FR via a joint sleeve 127. The sleeve 125 is formed as a cylindrical body having a sleeve bore 126 extending in the longitudinal-axis direction LD.

The inner housing 120 has a ball-screw housing region 121 which houses the ball-screw mechanism 160. The ball-screw mechanism 160 is an example that corresponds to a "bolt-gripping part driving mechanism" according to the present invention.

The ball-screw mechanism 160 mainly includes a ball nut 161 and a ball-screw shaft 169. A driven gear 162 is formed on an outer periphery of the ball nut 161 and engaged with the ball-nut drive gear 157. The driven gear 162 receives the rotation output of the motor from the ball-nut drive gear 157, which causes the ball nut 161 to rotate around the longitudinal axis LD. Further, the ball nut 161 has a bore 163 extending in the longitudinal-axis direction LD. A groove part 164 is provided in the bore 163.

The ball nut 161 of the present embodiment is supported so as to be rotatable around the longitudinal-axis direction LD by the inner housing 120 while being subjected to a strong axial force in the longitudinal-axis direction LD. Therefore, radial rolling bearings are disposed between an outer periphery of the ball nut 161 and the inner housing 120, and thrust rolling bearings are disposed on both axial ends of the ball nut 161.

Specifically, the ball nut 161 is supported at both ends by the inner housing 120 via a plurality of radial needle bearings 168 spaced apart from each other in the longitudinal-axis direction LD, so that the ball nut 161 is rotatable around the longitudinal axis LD. Further, a thrust ball bearing 166 is disposed between the ball nut 161 and the inner housing 120 on a front end part 161F of the ball nut 161 in the front side direction FR. With this structure, even if an axial force (thrust load) in the longitudinal-axis direction LD is applied to the ball nut 161, the thrust ball bearing 166 allows the ball nut 161 to smoothly rotate around the longitudinal-axis direction LD, while reliably receiving the axial force, thereby avoiding the risk that a strong axial force may impede rotation of the ball nut 161 around the longitudinal-axis direction LD.

Further, a thrust needle bearing 167 is disposed between the ball nut 161 and the inner housing 120 on a rear end part 161R of the ball nut 161 in the rear side direction RR. With this structure, even if an axial force (thrust load) in the longitudinal-axis direction LD is applied to the ball nut 161, the thrust needle bearing 167 allows the ball nut 161 to rotate around the longitudinal-axis direction LD, while reliably receiving the axial force in the longitudinal-axis direction LD, thereby avoiding the risk that a strong axial force may adversely affect rotation of the ball nut 161 around the longitudinal-axis direction LD. In the present embodiment, a thrust washer 165 is further disposed between the ball nut 161 and the thrust ball bearing 166, and also between the ball nut 161 and the thrust needle bearing 167.

As shown in FIG. 4, the thrust ball bearing 166 and the thrust needle bearing 167 are each configured to have a diameter larger than an outer diameter of the ball nut 161 at the front and rear end parts 161F, 161R of the ball nut 161, so as to avoid increase of the axial force (thrust load) applied to the ball nut 161 per unit area and thereby improve the operating performance and durability.

Further, as shown in FIGS. 4 and 5, the ball-screw shaft 169 is configured as an elongate body which extends in the longitudinal-axis direction LD. The ball-screw shaft 169 has a groove part (not shown for the convenience sake) formed in its outer periphery. The groove part is engaged with the groove part 164 of the ball nut 161 via balls. The ball-screw shaft 169 is configured to be linearly moved in the longitudinal-axis direction LD by rotation of the ball nut 161 around the longitudinal-axis direction LD. Specifically, the ball-screw shaft 169 serves as a motion converting mechanism for converting rotation of the ball nut 161 around the longitudinal-axis direction LD into linear motion in the longitudinal-axis direction LD. The ball nut 161 and the ball-screw shaft 169 are configured such that the groove part 164 of the ball nut 161 and the groove part (not shown) of the ball-screw shaft 169 are engaged with each other via the balls. The ball nut 161 and the ball-screw shaft 169 are examples that correspond to the "first mechanism part" and the "second mechanism part", respectively, according to the present invention.

The outer periphery of the driven gear 162 is dimensioned to be generally flush with an outer surface of the inner housing 120 through a notch-like hole 120H formed in the inner housing 120. In other words, the driven gear 162 is configured such that the outer periphery of the driven gear 162 does not protrude in the upper side direction U from the outer surface of the inner housing 120. This structure may contribute to reduction in a height (also referred to as a center height) CH from a shaft line 169L of the ball-screw shaft 169 to an outer surface of the outer housing 110 in the upper side direction U.

The ball-screw shaft 169 is integrally connected to a second connection part 189 of a bolt-gripping mechanism 180 (described later) via a threaded engagement part 171 formed in an end region of the ball-screw shaft 169 in the front side direction FR. Further, in an end region of the ball-screw shaft 169 in the rear side direction RR, an end cap 174 is provided, and as shown in FIG. 5, a pair of left and right rollers 173 are provided via left and right roller shafts 172 which are provided adjacent to the end cap 174 and protrude in the left side direction L and the right side direction R, respectively. The rollers 173 are rollably supported by the guide holes 124 of the guide flanges 123, respectively. Therefore, the ball-screw shaft 169 is stably supported in two different regions in the longitudinal-axis direction LD (supported at the both ends) via the ball nut 161 supported by the inner housing 120 and the guide holes 124 in which the rollers 173 are fitted. The ball-screw shaft 169 may be subjected to rotation torque around the longitudinal-axis direction LD when the ball nut 161 rotates around the longitudinal-axis direction LD. By abutment between the rollers 173 and the guide holes 124, however, the ball-screw shaft 169 can be prevented from being rotated around the longitudinal-axis direction LD due to such rotation torque.

It is noted that, in the present embodiment, the roller 173 is provided on the ball-screw shaft 169 side and the guide hole 124 is provided on the inner housing 120 (or the guide flange 123) side, but, vice versa, the guide hole 124 may be provided on the ball-screw shaft 169 side and the roller 173 may be provided on the inner housing 120 (or the guide flange 123) side.

The guide hole 124 may be replaced with another structure such as a guide rail as long as abutment with the roller 173 can be secured.

Further, as shown in FIG. 4, a magnet 177 is provided adjacent to the end cap 174 on the ball-screw shaft 169 via an arm mounting screw 175 and an arm 176. The magnet 177 is thus integrally provided on the ball-screw shaft 169, and moves together with the ball-screw shaft 169 when the ball-screw shaft 169 moves in the longitudinal-axis direction LD.

In the outer housing 110, an initial-position sensor 178 is provided in a position corresponding to a position in which the magnet 177 is located when the ball-screw shaft 169 is moved to its maximum extent in the front side direction FR as shown in FIG. 4, and a rearmost-end-position sensor 179 is provided in a position corresponding to a position in which the magnet 177 is located when the ball-screw shaft 169 is moved to its maximum extent in the rear side direction RR. Each of the initial-position sensor 178 and the rearmost-end-position sensor 179 is formed by a Hall element, and forms a position detecting mechanism configured to detect the position of the magnet 177. In the present embodiment, the initial-position sensor 178 and the rearmost-end-position sensor 179 are configured to detect the position of the magnet 177 when the magnet 177 is located within their respective detection ranges. FIG. 4 shows the fastening tool 100 placed in the "initial position".

As shown in FIG. 4, the bolt-gripping mechanism 180 mainly includes an anvil 181 and bolt-gripping claws 185. The bolt-gripping mechanism 180 or the bolt-gripping claws 185 is an example that corresponds to the "bolt-gripping part" according to the present invention.

The anvil 181 is configured as a cylindrical body having an anvil bore 183 extending in the longitudinal-axis direction LD. The anvil bore 183 has a tapered part 181T extending a specified distance in the longitudinal-axis direction LD from an opening 181E formed at its front end in the front side direction FR. The tapered part 181T has an inclination of angle α so as to be gradually tapered (narrower) in the rear side direction RR.

The anvil 181 is locked to the sleeve 125 and the sleeve bore 126 via a sleeve lock rib 182 formed on an outer periphery of the anvil 181 and is integrally connected to the inner housing 120.

The anvil bore 183 is configured to have a diameter slightly smaller than the outer diameter of the collar 6 shown in FIG. 1 such that the collar 6 may be inserted into the anvil bore 183 from the opening 181E while deforming, only when a fastening force (axial force) strong enough to deform the collar 6 is applied. The opening 181E of the anvil bore 183 is configured to have a diameter slightly larger than the outer diameter of the collar 6 so as to form an insertion guide part for guiding insertion of the collar 6 into the anvil bore 183.

The tapered part 181T is configured to have a length longer than the height of the collar 6 in the longitudinal-axis direction LD, so that the collar 6 lies within a region in which the tapered part 181T is formed in the longitudinal-axis direction LD even if the collar 6 is inserted into the anvil bore 183 to its maximum extent.

The bolt-gripping claw 185 may also be referred to as a jaw. Although not particularly shown, three such bolt-gripping claws 185 are arranged at equal intervals on an imaginary circumference when viewed in the longitudinal-axis direction LD. The bolt-gripping claws 185 are configured to grip a bolt-shaft end region 41 of the fastener 1 shown in FIG. 1. The bolt-shaft end region 41 is an example that corresponds to the "end region" according to the present invention. The bolt-gripping claws 185 are integrally formed with a bolt-gripping claw base 186. As shown in FIGS. 4 and 5, the bolt-gripping claw base 186 is connected to the ball-screw shaft 169 via a first connection part 187A, a second connection part 187B, a locking part 188, a third connection part 189 and a threaded engagement part 171. Further, as shown in FIGS. 4 and 5, the second connection part 187B and the locking part 188 are connected together by engagement between a locking flange 187C formed on a rear end of the second connection part 187B and a locking end part 188A formed on a front end of the locking part 188 in the longitudinal-axis direction LD. The locking flange 187C and the locking end part 188A are connected such that the second connection part 187B move together with the the third connection part 188 when the third connection part 188 moves in the rear side direction RR. Specifically, when the ball-screw shaft 169 moves in the rear side direction RR, the bolt-gripping claws 185 move together with the ball-screw shaft 169 in the rear side direction RR. On the other hand, when the third connection part 188 moves in the front side direction FR, the third connection part 188 moves relative to the second connection part 187B, corresponding to a space 190 formed in front of the locking end part 188A.

The ball-screw shaft 169 is configured to have a small-diameter part having the threaded engagement part 171 such that an outer periphery of the third connection part 189 is flush with an outer periphery of the ball-screw shaft 169.

Figure 6:
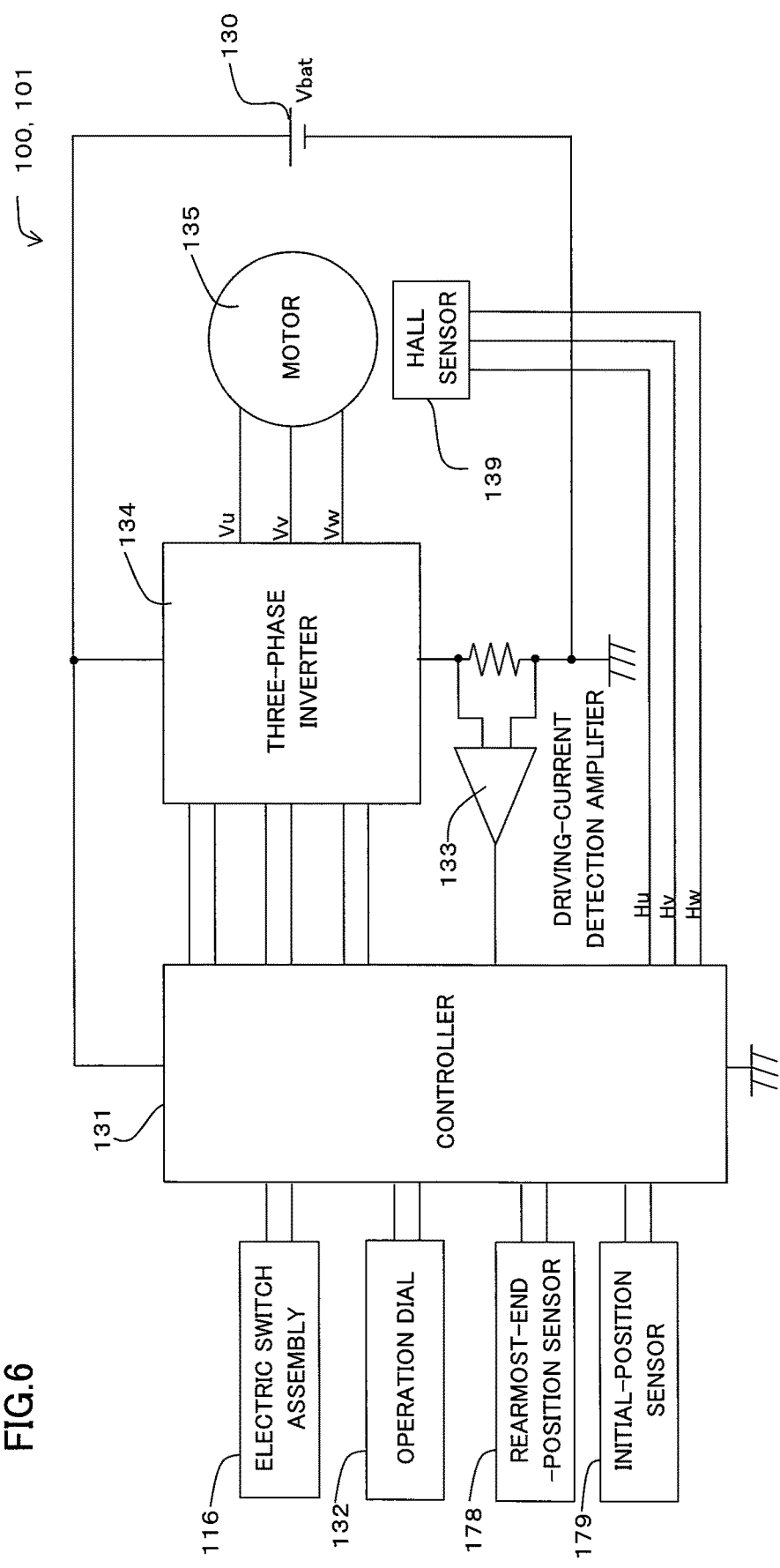
FIG. 6 is a block diagram schematically showing the structure of a motor-drive-control mechanism of the fastening tool.

FIG. 6 is a block diagram showing an electric configuration of a motor-drive-control mechanism 101 of the fastening tool 100 according to the present embodiment. The motor-drive-control mechanism 101 mainly includes a controller 131, a three-phase inverter 134, the motor 135 and the battery 130. Detection signals from the electric switch assembly 116, the operation dial 132, the initial-position sensor 178, the rearmost-end-position sensor 179, and a driving-current detection amplifier 133 for the motor 135 may be inputted to the controller 131.

The driving-current detection amplifier 133 is configured to convert a driving current of the motor 135 into a voltage by shunt resistance and output a signal amplified by the amplifier to the controller 131.

In the present embodiment, the DC brushless motor which is compact and has relatively high output is employed as the motor 135, and a rotor angle of the motor 135 is detected by Hall sensors 139 and detected values obtained by the Hall sensors 139 are transmitted to the controller 131. Further, in the present embodiment, the three-phase inverter 134 is configured to drive the brushless motor 135 by a 120-degree rectangular wave energization drive system.

Operation of the fastening tool 100 according to the present embodiment is now described.

Figure 7:
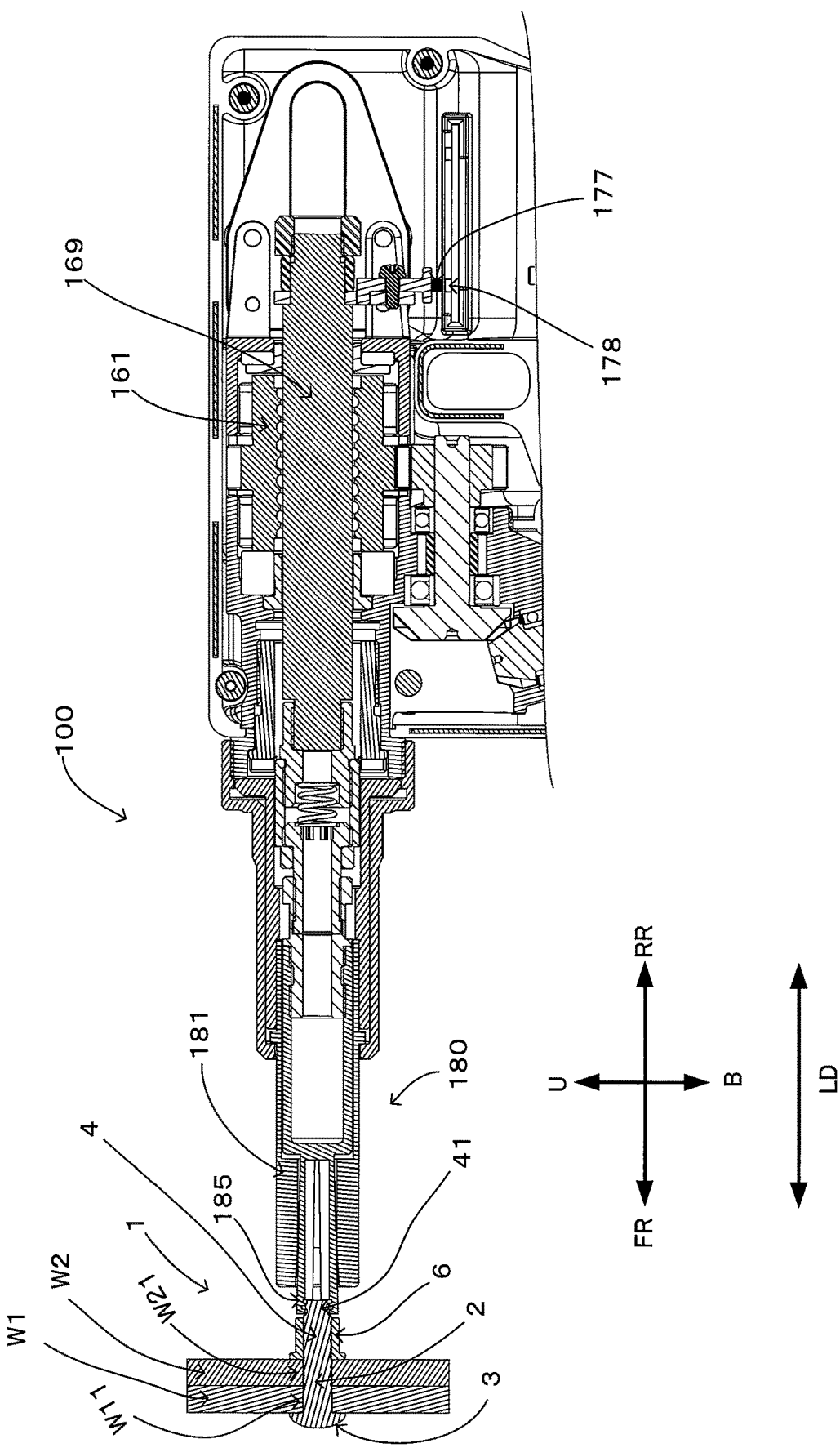
FIG. 7 is a partial sectional view showing an operation state of the fastening tool.

As shown in FIG. 7, the bolt shaft 4 of the bolt 2 is inserted through the through holes W11, W21 with the members W1, W2 to be fastened superimposed one on the other. Then the collar 6 is engaged with the bolt shaft 4 protruding to the member W2 side with the head 3 being in abutment with the member W1 to be fastened and the workpiece W is clamped (preliminarily assembled) between the head 3 and the collar 6.

After the above-described preliminary assembly, a user holds the fastening tool 100 with hand and engages the bolt-gripping claws 185 of the fastening tool 100 with the bolt-shaft end region 41. At this time, owing to the grooves 5 formed over generally the whole length of the bolt shaft 4 and a particularly large groove provided in the bolt-shaft end region 41 (see FIG. 1), the bolt-gripping claws 185 can be readily and reliably engaged with the bolt-shaft end region 41.

FIG. 7 shows a state in which the bolt-gripping claws 185 grip the bolt-shaft end region 41, that is, an initial state of the fastening operation. In the initial state of the fastening operation, the magnet 177 connected to the ball-screw shaft 169 is located in a position corresponding to the initial-position sensor 178 in the longitudinal-axis direction LD.

When the user manually operates the trigger 115 (see FIG. 2) in the initial state, the electric switch assembly 116 is switched on and the controller 131 normally rotates the motor 135 via the three-phase inverter 134. The manner of "normal rotation" refers to the driving manner in which the ball-screw shaft 169 moves in the rear side direction RR and thereby the bolt-gripping claws 185 move in the rear side direction RR.

Figure 8:
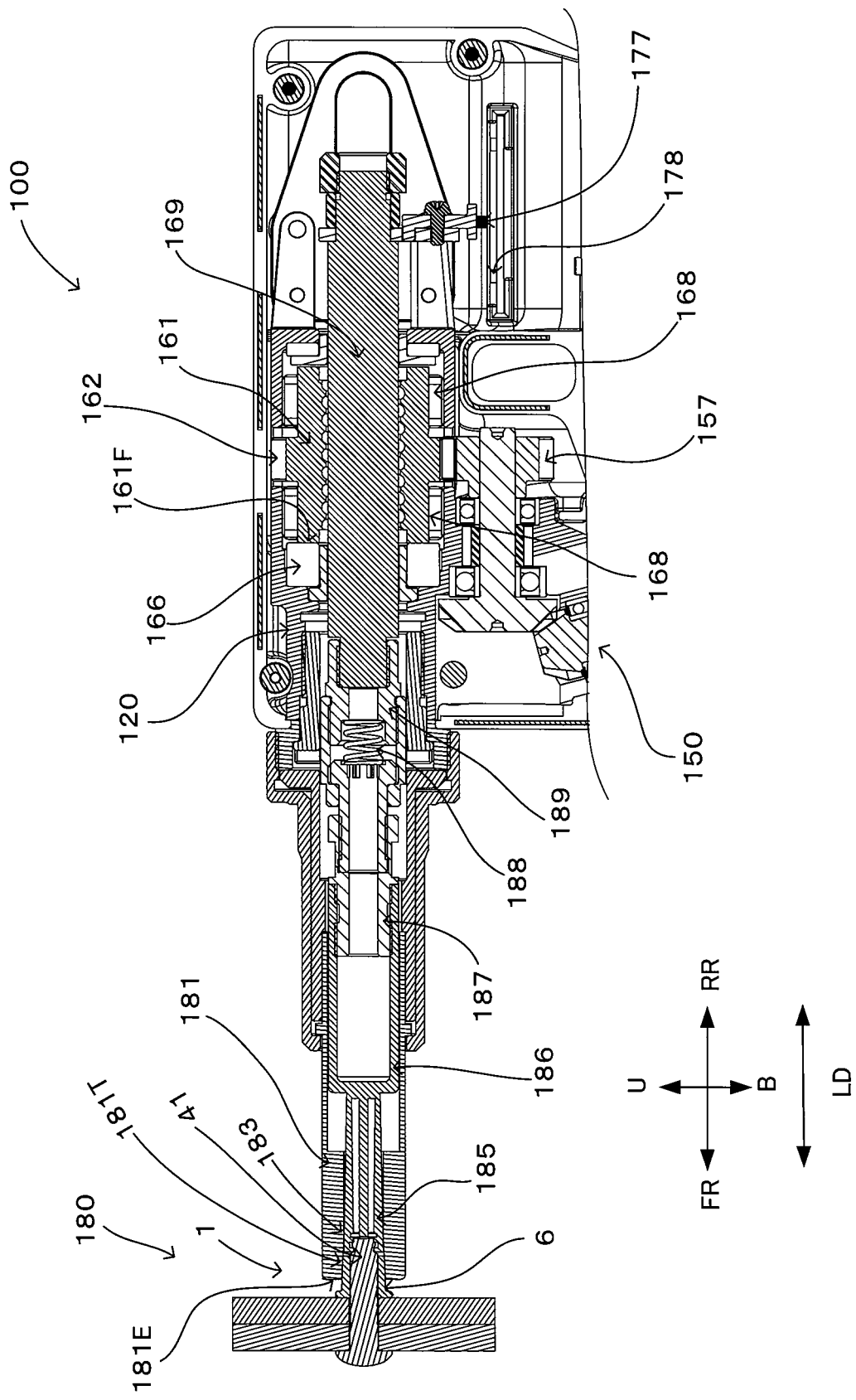
FIG. 8 is a partial sectional view showing an operation state of the fastening tool.

As shown in FIG. 8, when the motor 135 is driven to normally rotate, the driven gear 162 engaged with the ball-nut drive gear 157, which is a final gear in the bevel-gear speed-reducing mechanism 150, is rotationally driven, and thereby the ball nut 161 is rotationally driven in a normal direction (clockwise direction as viewed toward the front side direction FR from the rear side direction RR) around the longitudinal-axis direction LD. The ball-screw shaft 169 moves in the rear side direction RR while converting rotation of the ball nut 161 into linear motion. At this time, the bolt-gripping claws 185 also move in the rear side direction RR together with the ball-screw shaft 169, and the magnet 177 connected to the ball-screw shaft 169 moves away from the initial-position sensor 178 in the rear side direction RR and out of the detection range of the initial-position sensor 178.

As the bolt-gripping claws 185 move from the initial position in the rear side direction RR, the bolt-shaft end region 41 engaged and gripped by the bolt-gripping claws 185 is pulled in the rear side direction RR. Although the outer diameter of the collar 6 is slightly larger than the diameter of the opening 181E of the anvil bore 183, as the bolt-gripping claws 185 strongly pull the bolt-shaft end region 41 in the rear side direction RR, the collar 6 abuts on the anvil 181 and is restrained from further moving rearward. As the bolt-gripping claws 185 further move in the rear side direction RR, the collar 6 enters the tapered part 181T of the anvil bore 183 from the opening 181 while being reduced in diameter. When entering the tapered part 181T, the collar 6 is pressed in the front side direction FR and inward in the radial direction of the collar 6 and deforms, corresponding to a longitudinal-axis direction component and a radial direction component of the inclination angle α (see FIG. 4) of the tapered part 181T.

At this time, a strong load required for inserting the collar 6 into the anvil bore 183 is applied to the ball nut 161 as an axial force in the front side direction FR via the bolt gripping claws 185, the bolt-gripping claw base 186, the first connection part 187A, the second connection part 187B, the locking part 188, the third connection part 189 and the ball-screw shaft 169. In the present embodiment, the front end part 161F of the ball nut 161 is supported by the inner housing 120 via the thrust ball bearing 166. Therefore, the thrust ball bearing 166 receives the axial force in the front side direction FR while rolling around the longitudinal-axis direction LD so as to allow the ball nut 161 to rotate, thereby preventing this axial force from impeding smooth rotation of the ball nut 161.

Figure 9:
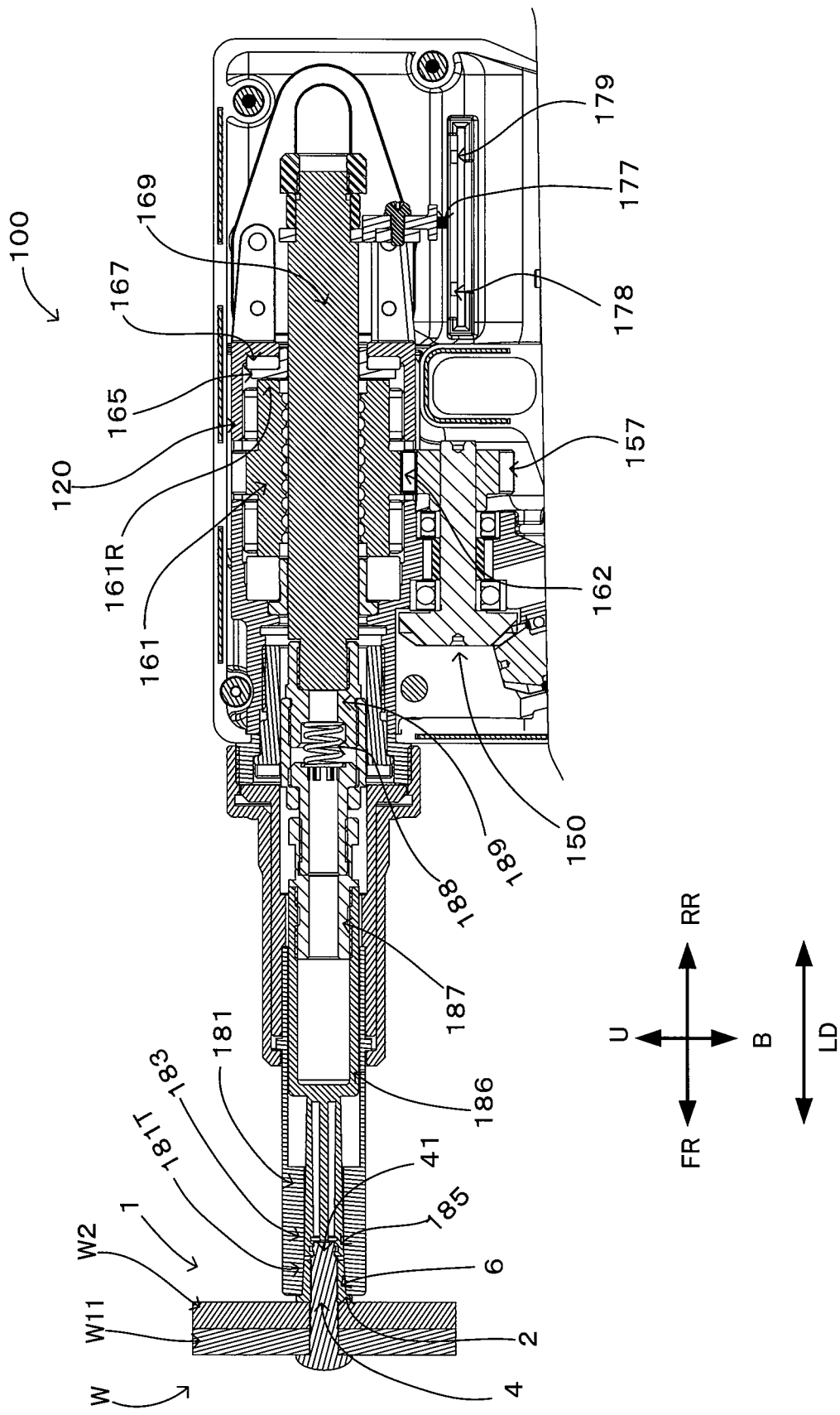
FIG. 9 is a partial sectional view showing an operation state of the fastening tool.

As shown in FIG. 9, as the ball nut 161 is further rotationally driven in the normal direction and the ball-screw shaft 169 moves in the rear side direction RR, the bolt-gripping claws 185 further pull the bolt-shaft end region 41 in the rear side direction RR from the state shown in FIG. 8. Thus, the collar 6 engaged in the anvil 181 proceeds deeper into the tapered part 181T. As a result, the collar 6 is further pressed strongly in the front side direction FR and inward in the radial direction of the collar 6, and the hollow collar part 7 formed as a smooth surface is firmly crimped (swaged) into the grooves 5 (see FIG. 1) formed in the bolt shaft 4. By this crimping, the hollow collar part 7 is engaged with the groove 5 by plastic deformation. Thus, swaging of the fastener 1 is completed and the operation of fastening the workpiece W is completed.

In the process leading to completion of the fastening operation, as shown in FIG. 9, the collar 6 becomes unable to proceed any deeper into the anvil bore 183 (enters a final stage of the fastening operation) before the magnet 177, which has moved away from the initial-position sensor 178, comes close to the rearmost-end-position sensor 179 in the longitudinal-axis direction LD. As a result, the driving current of the motor 135 rapidly increases. The controller 131 shown in FIG. 6 compares a driving current value inputted from the driving-current detection amplifier 133 with the preset threshold. As described above, this threshold may be appropriately selected by the user's manual operation of the operation dial 132 shown in FIG. 2. In the present embodiment, the threshold can be set at five stages according to a required axial force, that is, load required for the fastening operation.

In a case where the driving current value exceeds the specified threshold, the controller 131 determines that the fastening operation by swaging is completed and stops driving of the motor 135 via the three-phase inverter 134. The present embodiment employs a configuration in which an electric brake is actuated to quickly stop the motor 135 in a case where the driving current value exceeds the specified threshold.

In the present embodiment, output management is closely performed based on the driving current, so that the fastening operation can be completed while the fastener 1 shown in FIG. 1 remains integrated with the bolt shaft 4. Thus, the need for an additional operation of caring a broken part of the bolt shaft 4 after the fastening operation can be eliminated, so that the working efficiency can be improved.

As described above, FIG. 9 shows the fastening tool 100 which has completed the fastening operation by swaging. In order to make the fastening tool 100 ready for the next fastening operation, the fastening tool 100 should be returned from the operation-completed state shown in FIG. 9 to the initial state shown in FIG. 7 and the collar 6 swaged to the bolt 2 should be released from the anvil 181.

In the present embodiment, when the fastening operation is completed and the user turns off the trigger 115 (see FIG. 2), the controller 131 shown in FIG. 6 reversely rotates the motor 135 via the three-phase inverter 134. This reverse rotation of the motor 135 is transmitted to the ball nut 161 via the driven gear 162 which is engaged with the ball-nut drive gear 157 of the bevel-gear speed-reducing mechanism 150. Thus, the ball-screw shaft 169 moves in the front side direction FR and the bolt-gripping claws 185 also move in the front side direction FR together with the ball-screw shaft 169. At this time, a considerably strong load is required to release the collar 6 from the anvil 181 since the collar 6 is firmly stuck to the anvil bore 183 due to a strong load applied when the collar 6 was swaged. The load is applied to the ball nut 161 as an axial force in the rear side direction RR via the bolt-gripping claws 185, the bolt-gripping claw base 186, the first connection part 187A, the second connection part 187B, the locking part 188, the third connection part 189 and the ball-screw shaft 169.

In the present embodiment, the rear end part 161R of the ball nut 161 is supported by the inner housing 120 via (the thrust washer 165 and) the thrust needle bearing 167. Therefore, the thrust needle bearing 167 reliably receives the axial force in the rear side direction RR while rolling around the longitudinal-axis direction LD so as to allow the ball nut 161 to rotate, thereby preventing this axial force from impeding smooth rotation of the ball nut 161.

In the present embodiment, the axial force is received by the thrust ball bearing 166 during the normal rotation as described above, but the axial force is received by the thrust needle bearing 167 during the reverse rotation. The axial force required for releasing the collar 6 from the anvil 181 is relatively smaller than the axial force required for the swaging operation. Therefore, in consideration of differences in load receiving ability, size of occupied space and costs, the thrust needle bearing 167 is selected as a member for receiving the axial force during the reverse rotation. Of course, another thrust bearing (such as a thrust ball bearing) may be employed to receive the axial force during the reverse rotation, in place of the thrust needle bearing 167, depending on various kinds of working conditions of the fastening operation such as the material or properties of the workpiece W and the material or properties of the fastener.

Further alternatively, thrust needle bearings may be used to receive the respective axial forces during both the normal rotation and the reverse rotation, depending on the material or specifications of the workpiece W and the material or specifications of the fastener, if the working conditions of the fastening operation permit.

In the present embodiment, the maximum movable range of the ball-screw shaft 169 shown in FIG. 4 in the longitudinal-axis direction LD is set to correspond to the distance between the initial-position sensor 178 and the rearmost-end-position sensor 179. In other words, the distance of movement of the magnet 177 from the position corresponding to the initial-position sensor 178 to the position corresponding to the rearmost-end-position sensor 179 is given as the maximum movable range of the ball-screw shaft 169. For example, if the trigger 115 is turned on when the bolt-gripping claws 185 are not engaged with the bolt 2, the driving current value of the motor 135 which is substantially under no load does not reach the specified threshold, so that the ball-screw shaft 169 can move in the rear side direction RR until the magnet 177 reaches the rearmost-end-position sensor 179. The state in which the magnet 177 has reached the position corresponding to the rearmost-end-position sensor 179 is defined as a state in which the fastening tool 100 is in a "stop position".

On the other hand, when the bolt-gripping claws 185 grip the bolt 2 of the fastener 1 and the above-described fastening operation by swaging is performed, in the process leading to completion of the fastening operation, the driving current value of the motor 135 rapidly increases. Then, before the magnet 177 reaches the detection range of the rearmost-end-position sensor 179, the driving current value exceeds the specified threshold, and at this point of time, driving of the motor 135 is stopped.

Figure 10:
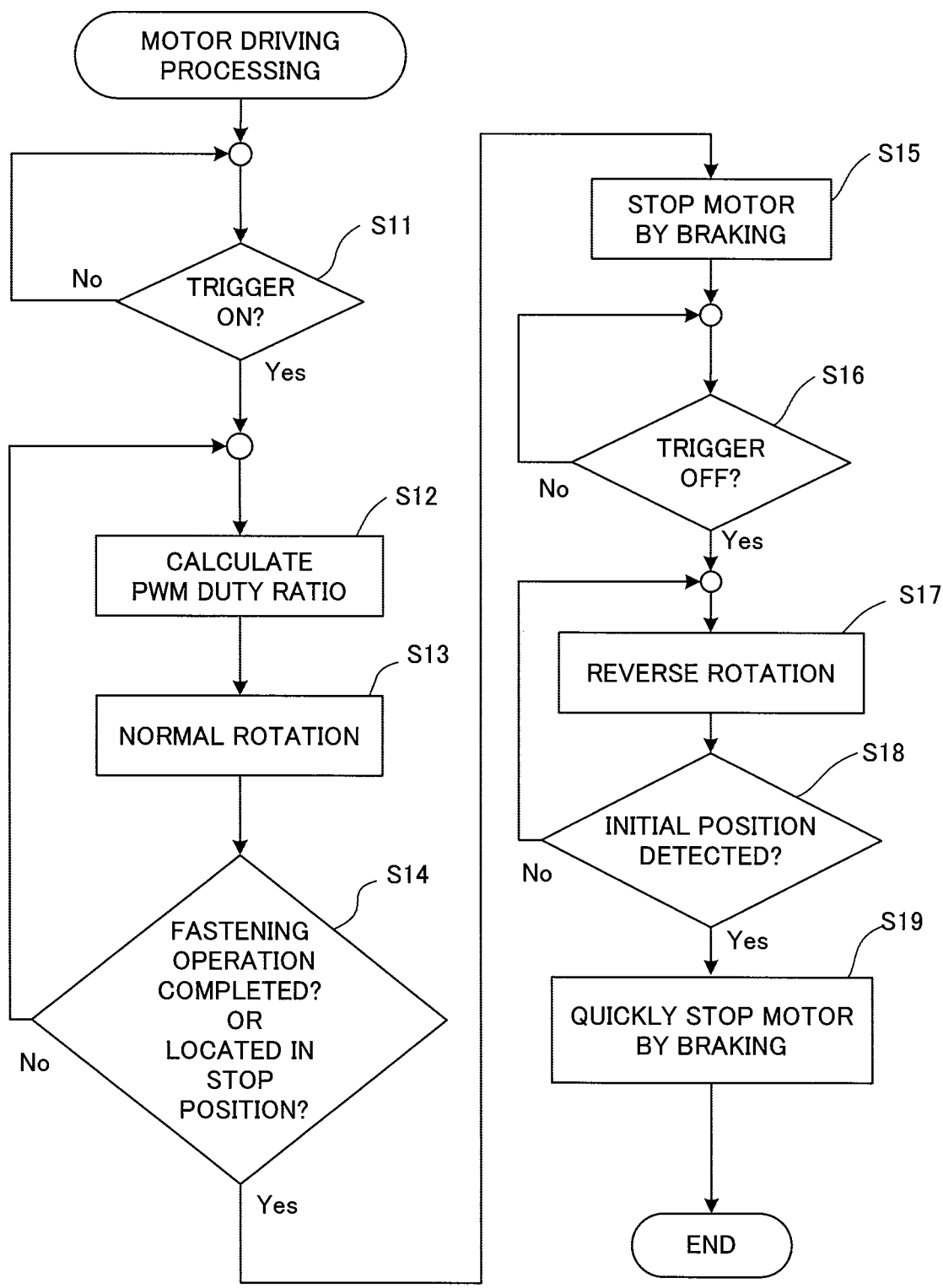
FIG. 10 is a flow chart showing a processing step in the motor-drive-control mechanism.

FIG. 10 shows an overview of a drive control flow in the motor-drive-control mechanism 101. Determination in the drive control flow is made by the controller 131 unless noted otherwise, and reference signs for components which are used in FIGS. 1 to 9 are also used in the following description and not shown in FIG. 10.

In a motor drive control routine, first in step S11, the on/off state of the trigger 115 and the electric switch assembly 116 is monitored. In a case where the on state of the trigger 115 is detected, in step S12, a duty ratio for driving the motor 135 is calculated and a PWM signal is generated in the three-phase inverter 134, and in step S13, the motor 135 is normally rotated. As described above, the "normal rotation" of the motor 135 corresponds to the linear movement of the ball-screw shaft 169 shown in FIG. 4 in the rear side direction RR and the movement of the bolt-gripping claws 185 in the rear side direction RR relative to the anvil 181. By the normal rotation of the motor 135 in step S13, the collar 6 is swaged to the bolt 22 in the fastener 1 shown in FIG. 1.

In step S14, it is determined whether the fastening operation is completed with the above-described driving current of the motor 135 exceeding the specified threshold, or whether the magnet 177 reaches the rearmost-end-position sensor 179 (or is located in the stop position). If completion of the fastening operation or the stop position is detected in step S14, the motor 135 is quickly stopped by an electric brake in step S15.

Subsequently, if a user's operation of turning off the trigger is detected in step S16, the motor 135 is reversely rotated in step S17. This reverse rotation is continued until the magnet 177 reaches the position corresponding to the initial-position sensor 178. If the initial position is detected in step S18, the motor 135 is quickly stopped by the electric brake (step S19) and the motor drive processing is completed.

In light of the above-described structures and operation, according to the present embodiment, the fastening tool 100 can be realized which is capable of completing swaging the fastener 1 while the bolt-shaft end region 41 remains integrated with the bolt shaft 4 without being broken, and has a rational compact structure which is capable of closely managing the axial force.

In view of the nature of the present invention and the present embodiment, the following features may be appropriately employed. Further additional features could be employed by adding any one or more of the following features to each of the claimed inventions.

Aspect 1

"Swaging of the fastener is completed by terminating a movement of the bolt-gripping part in the first direction relative to the anvil based on driving current of the motor."

According to this aspect, close output management can be performed by effectively utilizing the fact that the driving current of the motor increases as swaging of the fastener nears completion.

Aspect 2

"In aspect 1, the swaging of the fastener is completed when a driving current value of the motor exceeds a specified threshold."

According to this aspect, timing of completing the swaging can be reliably provided by setting a specified threshold relating to the driving current value of the motor.

Aspect 3

"At least one of the thrust rolling bearings on the first and second direction sides is configured to have a larger diameter than an outer diameter of the first mechanism part."

According to this aspect, load per unit area of the axial force applied to the thrust rolling bearing in the longitudinal-axis direction can be reduced.

Aspect 4

"Thrust washers are disposed between the housing and the thrust rolling bearing on the first direction side and between the housing and the thrust rolling bearing on the second direction side, respectively."

According to this aspect, provision of the thrust washers therebetween can improve ease of assembly and performance characteristics of the members.

Aspect 5

"The fastening tool further includes a restricting member configured to restrict the rotation of the second mechanism part around the longitudinal axis, and the restricting member also serves to guide the movement of the second mechanism part in the longitudinal-axis direction."

According to this aspect, the member configuration relating to operation of the second mechanism part can be simplified and rationalized.

Aspect 6

"In aspect 5, the restricting member includes a guide member which is connected to the housing and extends in the longitudinal-axis direction, and a guided member which is connected to the second mechanism part and configured to be guided in the longitudinal-axis direction in abutment with the guide member."

According to this aspect, the functions of restricting the rotation and guiding the movement can be reliably performed by abutment between the members.

Aspect 7

"In aspect 5 or 6, the guide member comprises an elongate hole extending in the longitudinal-axis direction and the guided member comprises a roller which is fitted in the elongate hole in abutment the elongate hole."

According to this aspect, the functions of restricting the rotation and guiding the movement of the second mechanism part can be performed by a simple structure comprising the elongate hole and the roller.

Aspect 8

"A bevel-gear mechanism for speed reduction is further disposed on a power transmission path from the motor to the first mechanism part."

According to this aspect, by provision of the bevel-gear mechanism, the orientation of the power transmission path can be appropriately changed, so that size reduction of the device structure can be facilitated.

Aspect 9

"A detecting mechanism is further provided which is configured to detect a position of the second mechanism part in the longitudinal-axis direction."

According to this aspect, return of the second mechanism part to the initial position can be ensured by detecting the position of the second mechanism part.

Aspect 10

"In aspect 9, the detecting mechanism includes a magnet and a Hall element which is configured to detect proximity of the magnet, and one of the magnet and the Hall element is provided in the second mechanism part while the other is provided in a component of the fastening tool other than the second mechanism part."

According to this aspect, the position of the second mechanism part can be reliably detected by using the magnet and the Hall element.

Description of the Numerals

W: workpiece, W1, W2: member to be fastened, W11, W21: through hole, 1: fastener, 2: bolt, 3: head, 4: bolt shaft, 41: bolt shaft end region, 5: groove, 6: collar, 7: hollow collar part, 100: fastening tool, 101: motor-drive-control mechanism, 110: outer housing, 111: motor housing region, 112: speed reducing gear housing region, 113: inner-housing housing region, 114: grip part, 115: trigger, 116: electric switch assembly, 117: controller housing region, 118: battery mounting part, 120: inner housing, 120H: hole, 121: ball-screw mechanism housing region, 122: guide flange mounting arm, 123: guide flange, 124: guide hole, 125: sleeve, 126: sleeve bore, 127: joint sleeve, 130: battery, 131: controller, 132: operation dial, 133: driving current detection amplifier, 134: three-phase inverter, 135: motor, 136: motor output shaft, 137: bearing, 138: cooling fan, 139: Hall sensor, 140: planetary-gear speed-reducing mechanism, 141A: first sun gear, 142A: first planetary gear, 143A: first internal gear, 141B: second sun gear, 142B: second planetary gear, 143B: second internal gear, 144: carrier, 150: bevel gear speed reducing mechanism, 151: drive-side intermediate shaft, 152: bearing, 153: drive-side bevel gear, 154: driven-side intermediate shaft, 155: bearing, 156: driven-side bevel gear, 157: ball nut drive gear, 160: ball-screw mechanism, 161: ball nut, 161F: front end, 161R: rear end, 162: driven gear, 163: bore, 164: groove, 165: thrust washer, 166: thrust ball bearing, 167: thrust needle bearing, 168: radial needle bearing, 169: ball-screw shaft, 169L: rotation axis, 171: threaded engagement part, 172: roller shaft, 173: roller, 174: end cap, 175: arm mounting screw, 176: arm, 177: magnet, 178: initial position sensor, 179: rearmost end position sensor, 180: bolt gripping mechanism, 181: anvil, 181T: tapered part, 182: sleeve lock rib, 183: anvil bore, 185: bolt gripping claw, 186: bolt-gripping claw base, 187A: first connection part, 187B: second connection part, 187C: locking flange, 188: locking part, 188A: locking end part, 189: third connection part, 190: space

The invention claimed is:

1. A fastening tool, which uses a fastener including a bolt and a cylindrical hollow collar that is engageable with the bolt, the bolt having a head part integrally formed with a shaft part having a groove, to fasten a workpiece between the head part and the collar, the fastening tool comprising:
   claws configured to grip an end region of the shaft part;
   an anvil configured to engage the collar;
   a ball screw assembly configured to drive the claws to move in a longitudinal-axis direction along a longitudinal axis of the fastening tool relative to the anvil;
   a motor configured to drive the ball screw assembly; and
   a housing that at least partially houses the ball screw assembly, wherein:
   the fastening tool is configured such that:
   when the claws grip the end region of the shaft part and move relative to the anvil in a first direction of the longitudinal-axis direction via the ball screw assembly, the anvil presses the collar fitted onto the shaft part in a second direction opposite to the first direction of the longitudinal-axis direction and inward in a radial direction of the collar, so that a hollow part of the collar is crimped to the groove while the workpiece is clamped between the collar and the head part, whereby swaging of the fastener is completed while the end region is integrated with the shaft part, and
   when the claws grip the end region of the shaft part and move relative to the anvil in the second direction via the ball screw assembly, the collar swaged to the bolt is released from the anvil and the end region of the shaft part is allowed to be released from the claws;
   the ball screw assembly includes:
      ball nut supported by the housing such that movement of the ball nut in the longitudinal-axis direction relative to the housing is restricted, and configured to be rotationally driven by the motor; and
      a ball screw shaft connected to the claws such that movement of the ball screw shaft in the longitudinal-axis direction is allowed and rotation of the ball screw shaft around the longitudinal axis is restricted;
   the ball screw shaft is configured to be driven in the longitudinal-axis direction by the ball nut being rotationally driven, so that the claws are moved in the longitudinal-axis direction relative to the anvil; and
   the fastening tool further includes:
   thrust rolling bearings on a first direction side and a second direction side of the ball nut, each of the thrust bearings being configured to receive an axial force in the longitudinal-axis direction transmitted from the claws to the ball nut via the ball screw shaft while allowing the ball nut to rotate; and
   radial rolling bearings that are (1) separate from the thrust rolling bearings and (2) radially between an outer periphery of the ball nut and an interior surface of the housing.

2. The fastening tool as defined in claim 1, wherein the thrust rolling bearing on the first direction side is a needle bearing.

3. The fastening tool as defined in claim 1, wherein the thrust rolling bearing on the first direction side abuts a rear end portion of the ball nut.

4. The fastening tool as defined in claim 1, wherein:
a gear is formed on the ball nut and configured to rotationally drive the ball nut via the motor, and
an outer periphery of the gear is configured to lie within an outer shell of the housing in an upper portion of the housing.

5. The fastening tool as defined in claim 1, wherein a planetary-gear assembly for speed reduction is in a power transmission path from the motor to the ball nut.

6. The fastening tool as defined in claim 1, wherein at least one of the thrust rolling bearings on the first and second direction sides is configured to have a larger diameter than an outer diameter of the ball nut.

7. The fastening tool as defined in claim 1, wherein thrust washers are between the housing and the thrust rolling bearing on the first direction side and between the housing and the thrust rolling bearing on the second direction side.

* * * * *